(12) United States Patent
Ferragut et al.

(10) Patent No.: US 9,319,421 B2
(45) Date of Patent: Apr. 19, 2016

(54) REAL-TIME DETECTION AND CLASSIFICATION OF ANOMALOUS EVENTS IN STREAMING DATA

(71) Applicant: UT-Battelle, LLC, Oak Ridge, TN (US)

(72) Inventors: Erik M. Ferragut, Oak RIdge, TN (US); John R. Goodall, Knoxville, TN (US); Michael D. Iannacone, Knoxville, TN (US); Jason A. Laska, Knoxville, TN (US); Lane T. Harrison, Boston, MA (US)

(73) Assignee: UT-Battelle, LLC, Oak Ridge, TN (US)

( * ) Notice: Subject to any disclaimer, the term of this patent is extended or adjusted under 35 U.S.C. 154(b) by 56 days.

(21) Appl. No.: 14/053,248

(22) Filed: Oct. 14, 2013

(65) Prior Publication Data

US 2015/0106927 A1    Apr. 16, 2015

(51) Int. Cl.
*G06F 12/14* (2006.01)
*H04L 29/06* (2006.01)

(52) U.S. Cl.
CPC ........ *H04L 63/1416* (2013.01); *H04L 63/1408* (2013.01); *H04L 63/1425* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 7,748,039 B2* | 6/2010 | Obrecht | G06F 21/566 726/25 |
| 8,015,133 B1* | 9/2011 | Wu et al. | 706/21 |
| 8,601,575 B2 | 12/2013 | Mullarkey et al. | |
| 2008/0271143 A1* | 10/2008 | Stephens | H04L 41/5061 726/22 |
| 2009/0030752 A1* | 1/2009 | Senturk-Doganaksoy et al. | 705/7 |
| 2010/0281539 A1* | 11/2010 | Burns et al. | 726/23 |
| 2011/0185422 A1 | 7/2011 | Khayam et al. | |
| 2012/0210423 A1* | 8/2012 | Friedrichs et al. | 726/22 |
| 2012/0278477 A1 | 11/2012 | Terrell et al. | |
| 2013/0198119 A1* | 8/2013 | Eberhardt, III | G06N 7/005 706/12 |
| 2014/0149806 A1 | 5/2014 | Khalastchi et al. | |
| 2015/0135262 A1 | 5/2015 | Porat et al. | |
| 2015/0161394 A1 | 6/2015 | Ferragut et al. | |

OTHER PUBLICATIONS

Cao et al., "Integration of Self-organizing Map (SOM) and Kernel Density Estimation (KDE) for Network Intrusion Detection," Unmanned/Unattended Sensors and Sensor Networks VI. Edited by Carapezza, Edward M. Proceedings of the SPIE, vol. 7480, article id. 74800N, 12 pp., 2009.

Chandola et al., "Anomaly dection: A survey," Journal ACM Computing Surveys (CSUR), vol. 41, Issue 3, Jul. 2009, Article No. 15, 58 pages.

Cook et al., "VAST Challenge 2012: Visual Analytics for Big Data," IEEE Vast, p. 251-255, IEEE Computer Science Society, Oct. 2012.

(Continued)

*Primary Examiner* — Fatoumata Traore
(74) *Attorney, Agent, or Firm* — Klarquist Sparkman, LLP

(57) ABSTRACT

A system is described for receiving a stream of events and scoring the events based on anomalousness and maliciousness (or other classification). The events can be displayed to a user in user-defined groupings in an animated fashion. The system can include a plurality of anomaly detectors that together implement an algorithm to identify low probability events and detect atypical traffic patterns. The atypical traffic patterns can then be classified as being of interest or not. In one particular example, in a network environment, the classification can be whether the network traffic is malicious or not.

17 Claims, 6 Drawing Sheets

(56) References Cited

OTHER PUBLICATIONS

Denning, "An Intrusion-Detection Model," IEEE Transactions on Software Engineering, vol. 13, Issue 2, Feb. 1987, pp. 222-232.
"Gu et al., ""BotMiner: Clustering Analysis of Network Traffic for Protocol- and Structure-Independent Botnet Detection,"" Proceedings of the 17th conference on Security sympiosium, pp. 139-154, 2008.".
Huang et al., "In-Network PCA and Anomaly Detection," Advances in Neural Information Processing Systems, pp. 617-624, 2006.
Portnoy et al., "Intrusion Detection with Unlabeled Data Using Clustering," Proceedings of ACM CSS Workshop on Data Mining Applied to Security, 2001, 14 pages.
Tandon et al., "Tracking User Mobility to Detect Suspicious Behavior," In SDM, pp. 871-883, 2009.

* cited by examiner

REAL-TIME DETECTION AND CLASSIFICATION OF ANOMALOUS EVENTS IN STREAMING DATA

ACKNOWLEDGMENT OF GOVERNMENT SUPPORT

This invention was made with government support under Contract No. DE-ACO5-00OR22725 awarded by the U.S. Department of Energy. The government has certain rights in the invention.

BACKGROUND

Anomaly detection is the search for items or events which do not conform to an expected pattern. The detected patterns are called anomalies and translate to critical and actionable information in several application domains.

There are different categories of anomaly detection including unsupervised and supervised anomaly detectors. Unsupervised anomaly detection techniques detect anomalies in an unlabeled test data set under the assumption that the majority of the instances in the data set are normal by looking for instances that seem to fit least to the remainder of the data set. Supervised anomaly detection techniques require a data set that has been labeled as "normal" and "abnormal" and involves training a classifier.

Anomaly detection is applicable in a variety of domains, such as intrusion detection, fraud detection, fault detection, event detection in sensor networks, etc. Nonetheless, a particular type of intrusion detection has remained problematic. More specifically, a zero-day attack or threat is an attack that exploits a previously unknown vulnerability in a computer application. Zero-day attacks are used or shared by attackers before the developer of the target software knows about the vulnerability. As such, they can be very difficult to defend against.

DETAILED DESCRIPTION

A system is described for receiving a stream of events and scoring the events based on anomalousness and maliciousness (or other classification). The events can be displayed to a user in user-defined groupings in an animated fashion. The system can include a plurality of anomaly detectors that together implement an algorithm to identify low-probability events and detect atypical traffic patterns.

Figure 1:
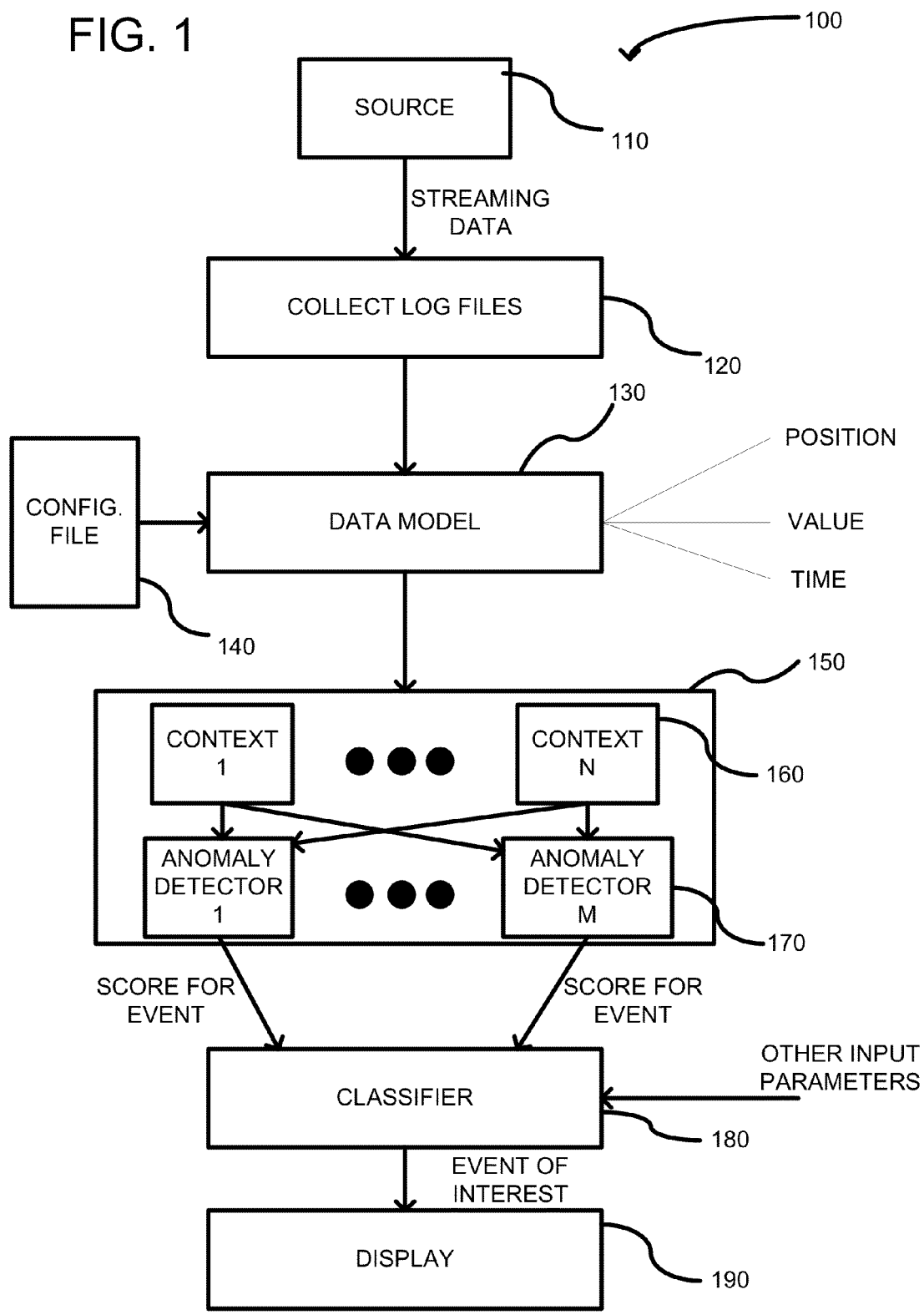
FIG. 1 is a system diagram for detecting and classifying anomalous events.

A particular system 100 is shown in FIG. 1. A source 110 can be any source that provides streaming data. In one example, the source can be any network component, such as a firewall or an operating system. The input stream typically includes events, which are actions or occurrences that are detected by a program or hardware component. The events can be associated with a time-stamp in conjunction with captured data. The format of the input stream can vary depending on the source 110, but generally the input streams include a network address (e.g., an IP address) and a time stamp. Other examples of the input stream include firewall data that includes source and destination IP addresses, source and destination port addresses, a protocol, and a message value defined by the firewall. Still another example of the input stream can be network data that includes source and destination IP addresses, source and destination ports, a protocol, and bytes or packets associated with message data. The input stream can be received in component 120, which collects log files. The component 120 can include memory registers and processing capacity to implement a parser, which analyzes the syntax of the input streaming data and transforms it into a standard format (e.g., JSON or other text-based languages). The parsed event data can then be placed in a message queue for consumption by a data model 130.

The data model 130 pulls event data from the message queue and transforms the data into a Position, Value, Time format. The Position is a set of defining characteristics for the event, the Value is a description of the event, and the Time is a measure of time for when the event occurred. In some embodiments, the Position describes network data, which includes source and destination network addresses, source and destination port addresses, and a protocol. There can be multiple concurrent definitions of Position for a given data value. The data model 130 can perform analysis on the Position to generate multiple overlapping relationships from a single event (i.e., a single log entry). For example, analysis can be done whether traffic originated from a source as well as the likelihood that traffic passed between nodes on the same log entry by using multiple definitions of Position. A configuration file 140 can be coupled to the data model to include multiple definitions of Position, Value and/or Time to define roles for given network resources. Each definition can create a corresponding configurable probabilistic model used to describe anomalousness of traffic data.

In one particular example, structured log events can be parsed and normalized into the Position-Value-Time (PVT) format, while appending a unique ID and the source of the data to the output tuple. The transformation from raw data to PVT format is as follows:

Log file: P: source IP, destination IP, source port, destination port, and protocol, V: signature, T: timestamp.

Firewall Logs: P: source IP, destination IP, source port, destination port, and protocol, V: message code, T: timestamp.

For example, given the following firewall log event:

05 Apr. 2012 18:24:18, Info,Built, ASA-6-302013,TCP, 172.23.85.172,10.32. 0.100, (empty), (empty),1421,80, http,outbound,1,O It is parsed into the following PVT format:

P: (172.23.85.172,10.32.0.100,1421,80, TCP)
V: ASA-6-302013
T: 1333650318

The following additional Positions are computed using the parsed form:

P_1: IP->IP (172.23.85.172, 10.32.0.100)
P_2: IP (172.23.85.172)
P_3:   IPGroup->IPGroup.port.port.protocol   (internal workstation, firewall, 1421, 80, TCP) using an internal IP list P_4: IP'Group->IPGroup,port group (internal workstation, firewall, webtraffic) using known information about common ports.

In sum, the data model 130 transforms a plurality of disparate data sets into a common abstraction so that each event has at least a Position, Value and Time parameter.

The PVT parameters can be input into an anomaly scorer 150, which includes a plurality of context definitions 160. There can be any desired number (N) of context definitions and the context definitions 160 can aggregate the Position, Value and Time parameters in multiple ways simultaneously for the same event. For example, only a portion of the Position sub-parts can be added in one context, while a different context can include other Position sub-parts. Some context definitions can include the Value parameter and others not, for example. Any desired combinations of the Position, Value and Time can be used. The anomaly scorer 150 can further include any desired number (M) of anomaly detectors 170 coupled to one or more of the context definitions 160 (M is any integer number and can be equal to N). Each anomaly detector 170 generates a score based on the anomalousness of the event. Each event, therefore, can have a plurality of anomaly scores. As further described below, the anomaly detectors 170 can include additional inputs that can be used in generating the scores.

The anomaly score of an event x in a context can be computed as the $-\log_2$ of the probability that a random event in that context has probability less that x. The anomaly detectors 170 can be grouped into broad categories by model type. Example broad categories include groups of IP addresses, groups of ports, groups of protected servers, mail servers, etc. The detectors can examine a sequence of events under Markov assumptions for observing changes in Value and inter-arrival Time of events. The other type is an iteratively updated, multinomial distribution with configurable Bayesian priors to examine the anomalousness of an occurrence of a positional event. The overall anomaly detection is an unsupervised learning based on the PVT parameters. The anomaly scorer 150 computes whether or not the event is atypical from a historical perspective, but to determine whether the anomalous score is one of interest, a classification is performed in classifier 180. The classifier 180 can combine a plurality of anomaly scores from the anomaly detectors 170 to generate an overall score indicative of whether the event is one of interest. The classifier 180 can also receive other input parameters, such as a network policy document and a network role document, which are further described below. In some embodiments, the output score of the classifier 180 is a maliciousness score that is calculated for each event using the plurality of anomaly scores.

The plurality of the anomaly scores can be combined into an overall anomaly score, if desired. The anomaly score and the score generated by the classifier constitute the analytic component of the system. The classifier scoring algorithm can incorporate the results of the anomaly detector, the anomalousness of traffic distributed by network role, the policy violation classification, and the data alignment with the log files. In the event of detecting malicious network traffic, the maliciousness scoring takes into account aggregation by network role. A user-defined label is assigned to each firewall log entry. For example, 10.32.5.51 is assigned to role websites, and 172.23.0.10 is assigned to role DNS. This assignment scheme takes into account situated knowledge about the analyst's environment to provide a background model with which to find anomalous events.

Maliciousness can also incorporate the situated knowledge of network policies to guide analyst behavior beyond low probability events to more actionable intelligence. The classifier can encode corporate network policy to determine policy violations. Examples of traffic that violated the policy defined by the challenge include: IRC traffic, FTP traffic, and telnet traffic. Visualizing the results of classification by policy violation enabled finding a collection of IP addresses that could be involved with the main thrust of the network attack.

Maliciousness scoring can also use the domain knowledge incorporated into the log data. The firewall and an intrusion detection system (IDS) (not shown) can model traffic at different points in the network; incorporating the two opens the possibility of uncovering an attack vector whose constituent subparts are distributed across multiple datasets. A firewall entry can be classified as more suspicious if either the Source or Destination IP has been flagged in the IDS over a five minute interval centered at the firewall log event (to allow for IDS processing time lag).

Finally, a display 190 is shown as coupled to the classifier 180 for displaying the event data of interest. In the case of network traffic, the display can present malicious events in any desired fashion. The maliciousness and anomalousness scores help point an analyst at suspicious traffic, but ultimately it is the human domain expert that must examine suspicious events to determine if they constitute an attack. To support this process, the visualization facilitates real-time situational understanding and provides interaction mechanisms and additional views that allow the analyst to gather additional information on suspicious activity.

Figure 2:
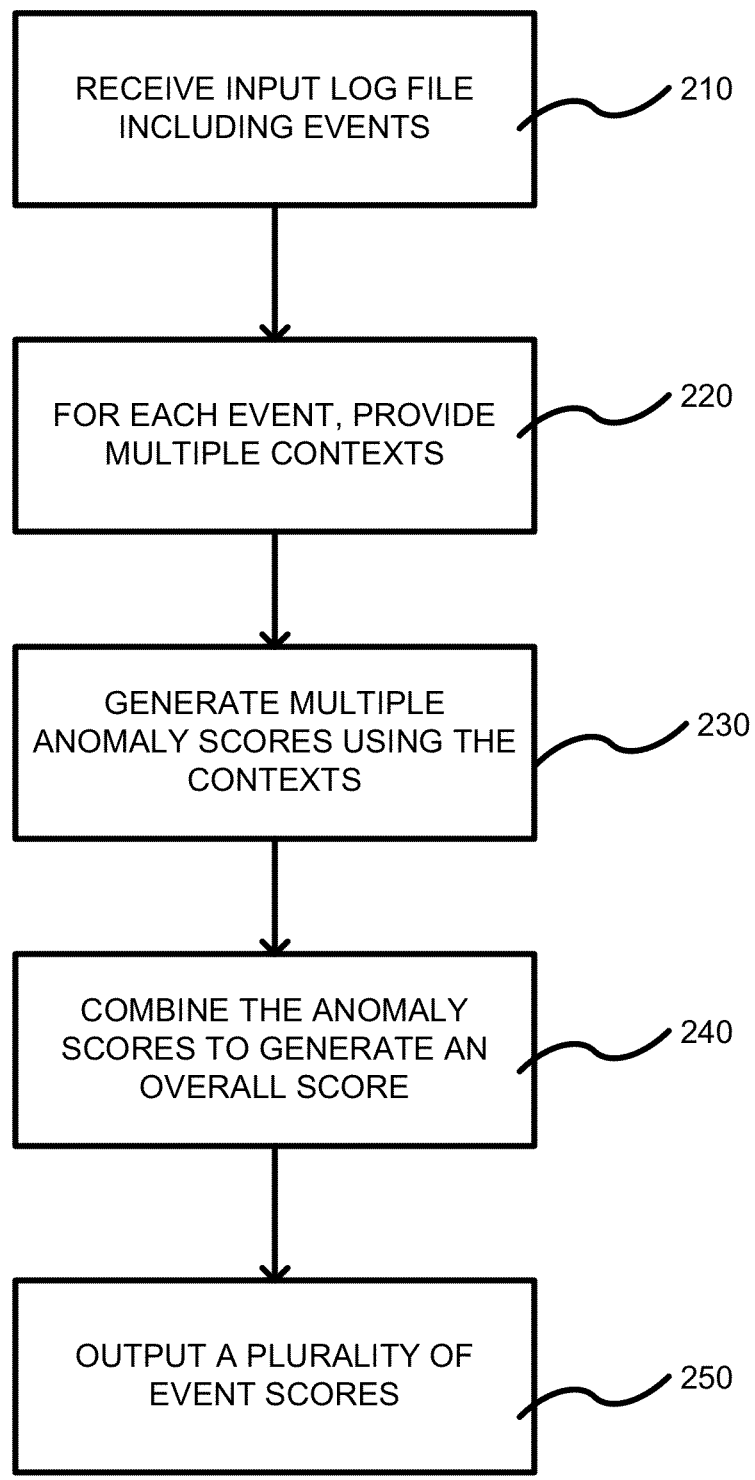
FIG. 2 is a flowchart of a method according to one embodiment for detecting and classifying anomalous events.

FIG. 2 is an embodiment of a flowchart for detecting and classifying anomalous events. In process block 210, an input log file is received. The input log file includes a plurality of events, which are time stamped data sets received from a source component, such as a network component (e.g., firewall, operating system, mail servers, etc.). In process block 220, for each event, multiple contexts are provided. The multiple contexts group the data set into multiple sub-groups. For example, position data can include a source IP address, a destination IP address, a source port, a destination port, and a protocol. One context grouping can include only the source IP address, destination IP address, value and time, whereas another context grouping can include only a source and destination port, Value and Time. Thus, each event has multiple contexts in which it is viewed. In process block 230, multiple anomaly scores are generated for the contexts. The anomaly scores are generated using anomaly generators, as described in FIG. 1. The anomaly generators do not necessarily have a one-to-one correspondence with the contexts, as each anomaly generator can be associated with one or more contexts, depending on the design. An overall anomaly score can be computed based on a logical combination of the anomaly scores from the anomaly generators (process block 240). For example, the classifier 180 of FIG. 1 can generate a logical combination of the anomaly scores. In process block 250, one or more scores associated with an event can be outputted, such as on a display. The event scores can include the overall anomaly score and possible other scores, such as the output score of the classifier 180 (FIG. 1), which indicates if the event is of interest. In the case of network events, an event of interest can be whether the event is believed to be malicious. Other events of interest can be used based on the particular application.

Figure 3:
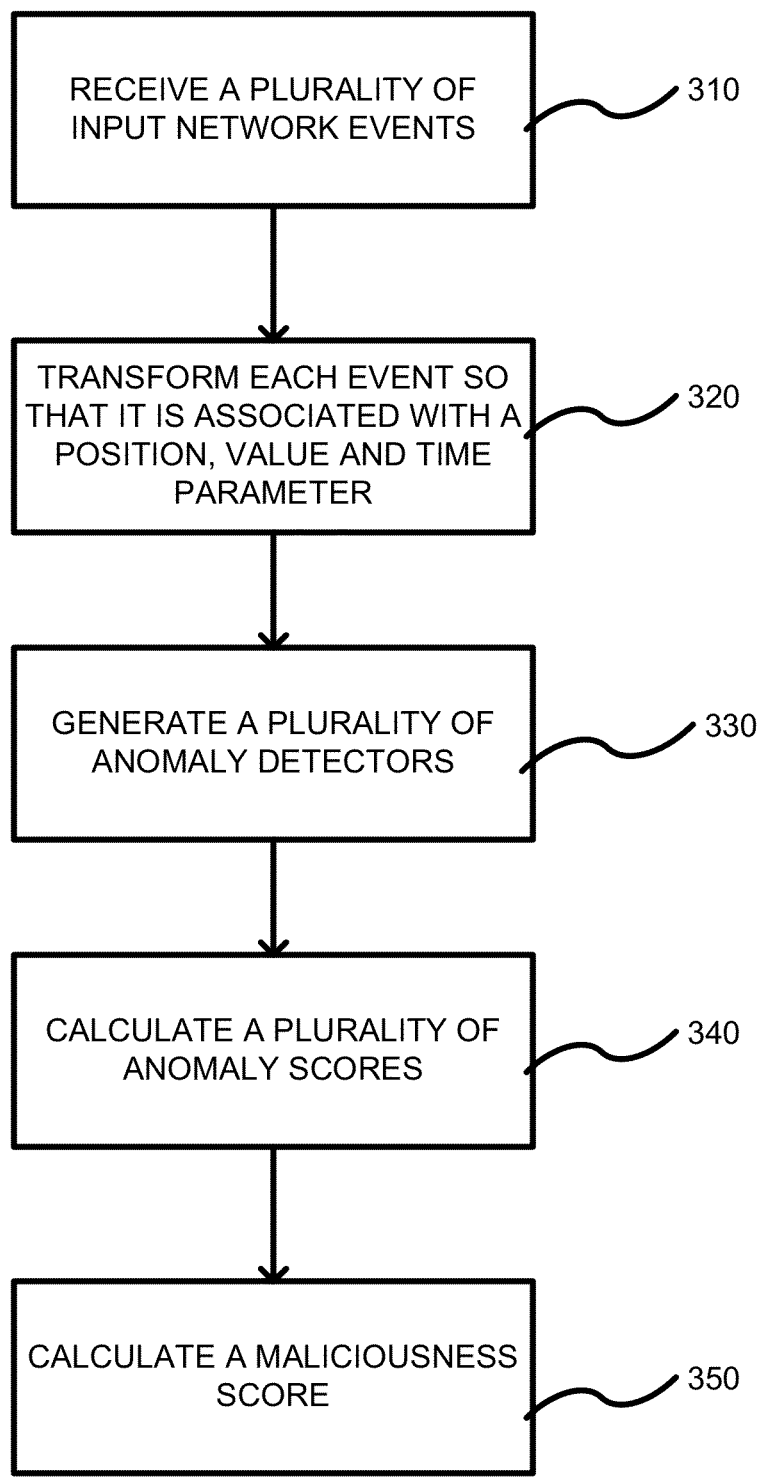
FIG. 3 is a flowchart of a method according to another embodiment for detecting and classifying anomalous events.

FIG. 3 is a flowchart according to another embodiment for detecting and classifying anomalous events in a network environment. In process block 310, a plurality of input network events are received. The data received can be supplied by any network source, such as a firewall, operating system, DNS server, website, etc. The plurality of events can be a continuous stream of events that are received in real-time as the events occur on the network. In process block 320, the event is transformed so that it is associated with a Position, Value and Time parameter. In the network environment, the Position can include at least a source and destination network address (e.g., an IP address). The Value is a description of the event (such as a message associated with network traffic) and the Time parameter indicates when the event occurred. In process block 330, a plurality of anomaly detectors are generated. The anomaly detectors are unsupervised and generate a plurality of scores indicating whether the event conforms with expected behavior and/or past history. Generation of the anomaly detectors includes using multiple context definitions that group the transformed event data into multiple different sub-groups so as to look at the event data from different perspectives. In process block 340, a plurality of anomaly scores are calculated using the anomaly detectors. Using the plurality of anomaly scores, an overall anomaly score can be calculated, such as by using an average or a maximum of the anomaly scores. In process block 350, a maliciousness score can be calculated. The maliciousness score can include using a linear combination of the anomaly scores. The maliciousness score can be calculated using an algorithm that includes a plurality of predicates and weighting information. An example algorithm can be as follows: (weight1)(predicate1)+ (weight2)(predicate 2)+ . . . (weightN)(predicate N). A configuration file can exist that allows users to set the weights used in the algorithm.

In a particular embodiment, the malicious scorer can be a signature-based system using a user customizable predicate system for direct injection of domain knowledge and a probabilistic model of observed traffic into the scoring mechanism.

Three separate predicates can be used to demonstrate scoring events' maliciousness based on domain knowledge.
1. High value target: determines if an event is targeting a protected resource, such as a database server;
2. Policy violation: determines if a network rule has been violated by an event, such as IRC traffic; and
3. Role violation: determines if traffic between machines on the network is unexpected based on the role of the machine, such as not expecting web traffic to the database servers.

The maliciousness score can then be used to detect violations in network traffic. An administrator can view the maliciousness score or an automated system can be used to alarm an administrator of the potential malicious event.

Figure 4:
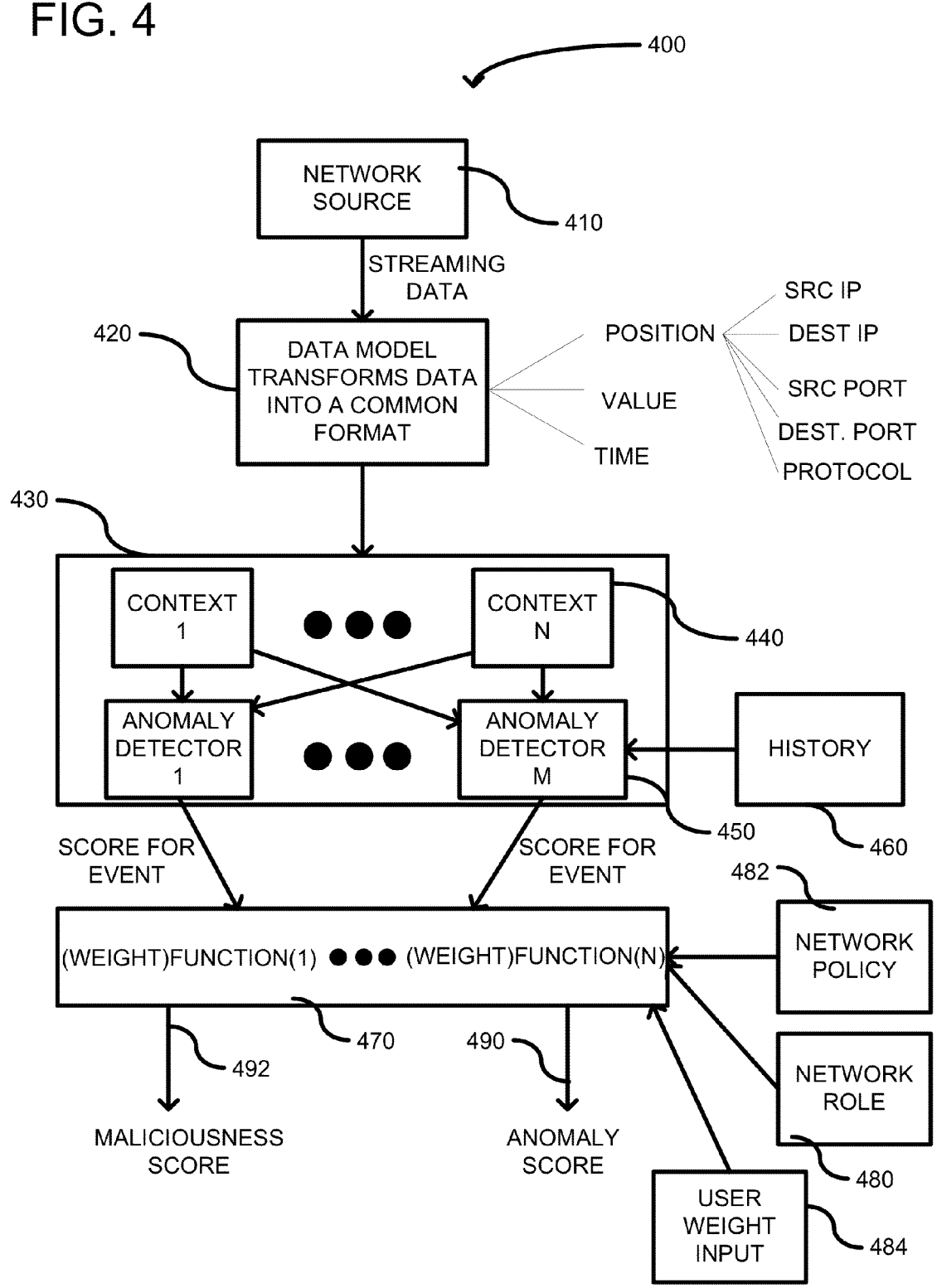
FIG. 4 is a system diagram according to another embodiment for detecting and classifying malicious network events.

FIG. 4 shows a particular system 400 that can be used for detecting malicious events in a network environment. A network source 410 provides real-time streaming data over a network. The network source 410 can be any hardware or software component in a network including operating systems, server computers, routers, switches, and associated software. A data model 420 transforms the streaming data into a common format. As illustrated, data can be modeled in a domain-agnostic format that encodes the Position, Value, and Time (PVT) of the input event. The translation of the event data into the PVT format is dependent on the data set. The Position is a set of defining characteristics for the event. The Value is a description of the event. The Time is a measure of time for when the event occurred. All data within the online computation system are defined as tuples. In the illustrated implementation, the Position is the five tuple describing the traffic, the Value of an entry is the reported message code, and the Time is the time of the event. The five-tuple Position is shown as including a source IP address, a destination IP address, a source port address, a destination port address, and a protocol. Other Position tuples can be used.

An anomaly scorer 430 includes a plurality of contexts 440 and anomaly detectors 450 coupled together in a desired configuration. The contexts 440 are peer groupings, which are used to aggregate similar events to uncover atypical and malicious patterns. Any number of contexts can be defined. The anomaly detectors 450 can be coupled to one or more of the contexts and can further receive history data 460 (which can be stored in memory or in a database). The anomaly detectors 450 can retrieve a previous state that was the same as the current state to determine whether the current state is anomalous. A percentage of deviation between the current state and the previous stored state can be determined and factored into the overall anomaly score for the event. Each of the anomaly detectors 1-M calculates a score for the same event. Using the calculated scores, an overall anomaly score shown at 490, can be determined, either in the anomaly scorer 430 or in a classifier 470.

The classifier 470 can receive the plurality of anomaly scores from the anomaly scorer 430 and compute a maliciousness score using a plurality of weighted predicates or functions. The functions can include a parameter associated with the anomaly score as well as other input parameters. For example, the maliciousness scoring algorithm can also incorporate the anomalousness of traffic distributed by a network role 480, a policy violation classification 482, and the data alignment with the intrusion detection system (IDS) logs. The algorithm can further input user-supplied weighting parameters 484. Given an assignment of 'role' to machines on a network, such as Firewall, DNS, External Website, a data point can provide evidence of changes in the relationship between roles by using the positional aggregations (role of source ip, role of destination ip) and (role of source ip). Such "network role" data can be stored in a database 480 that is retrievable by the classifier 470.

In one example embodiment, a user-defined label can be assigned to each firewall log entry. For example, 10.32.5.51 can be assigned to role websites, and 172.23.0.10 can be assigned to role DNS. This assignment scheme takes into account situated knowledge about the analysts environment to provide a background model with which to find anomalous events. Maliciousness can also incorporate the situated knowledge of network policies to guide analyst behavior beyond low probability events to more actionable intelligence. The classifier 470 can encode corporate network policy to determine policy violations.

Finally, maliciousness scoring can also use the domain knowledge incorporated into IDS data. The firewall and the IDS model traffic at different points in the network; incorporating the two opens the possibility of uncovering an attack vector whose constituent subparts are distributed across multiple datasets. A firewall entry can be classified as more suspicious if either the Source or Destination IP has been flagged in the IDS over a five minute interval centered at the firewall log event (to allow for IDS processing time lag).

In summary, the system 400 identifies deviations in typical or expected network behavior by leveraging unsupervised anomaly detection, situated knowledge of role and policy, and domain knowledge encoded in the IDS logs.

Figure 5:
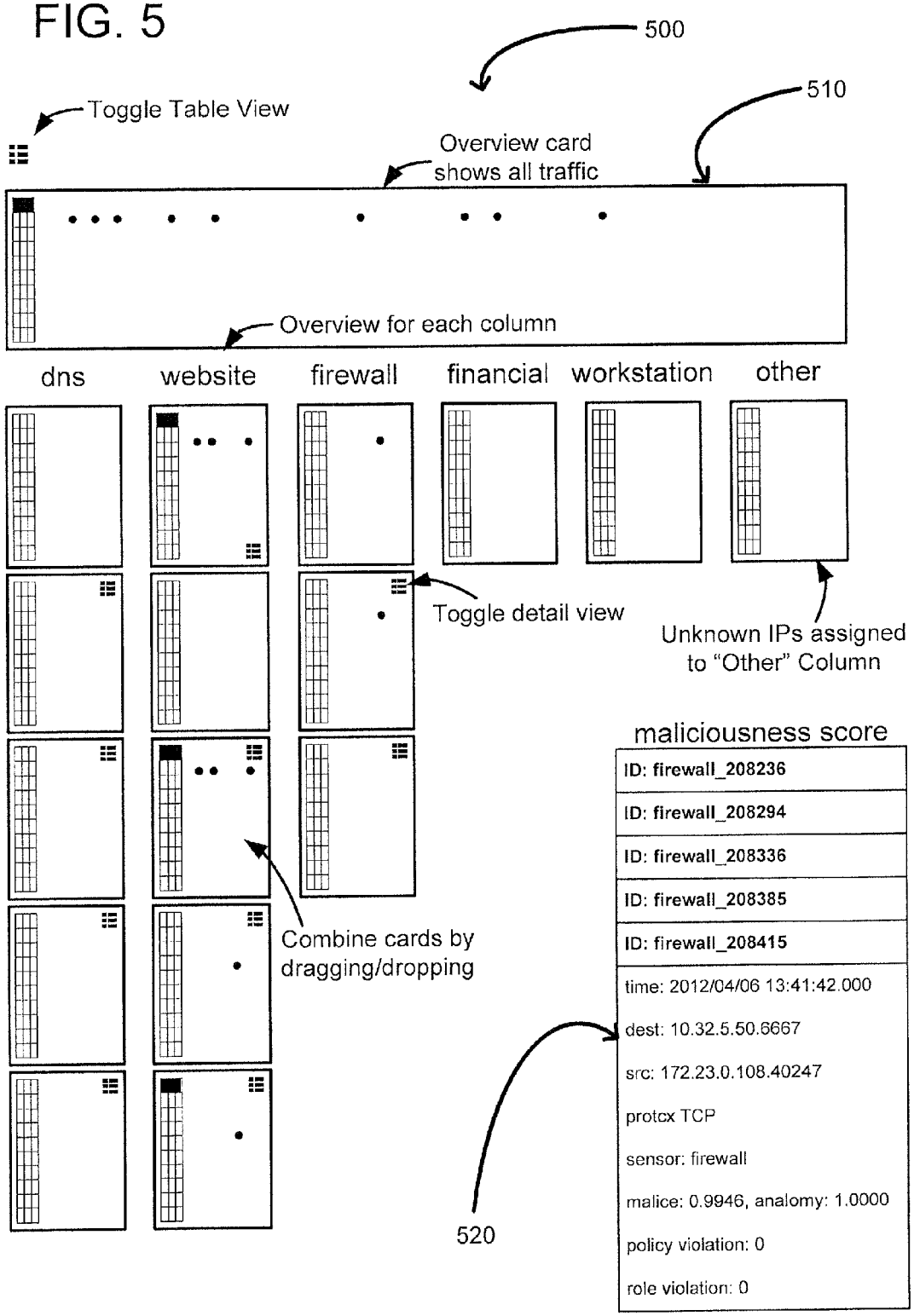
FIG. 5 is an embodiment of a display that can be used for any of the embodiments described herein.

FIG. 5 is an example output display 500 that can be used with the different embodiments described herein. Other output formats can be used. Both of the anomalousness and the maliciousness scores can be used in the display 500. Anomalousness refers to how atypical an event is given past events. Maliciousness incorporates machine roles, policy violations, and IDS logs. These scores help point an analyst at suspicious traffic, but ultimately it is the human domain expert that should examine suspicious events to determine if they constitute an attack. To support this process, the display 500 facilitates real-time situational understanding and provides interaction mechanisms and additional views that allow the analyst to gather additional information on suspicious activity.

In the particular embodiment of FIG. 5, individual machines or groups of machines are visually manifested as "cards". The cards can be thought of as a variation of small multiples, as the only events displayed on a card are those which involve the IP(s) assigned to that card. When a new IP appears in the traffic, it is added to the appropriate column (group), which is determined by incorporating the IP-to-group information from the challenge network specification.

Cards can be dragged and dropped to form groups to allow aggregations based on analysts' mental models. A large card 510 shown at the top in FIG. 5 is a grouping of all IPs and each column also has an aggregated card at the top of the column. These aggregations mitigate the problem of having more cards than available screen space, since individual events are still seen in the aggregated cards.

Events can appear as dots which travel from right to left with each time step and maliciousness assigned to the vertical position. Dots that are higher on the Y axis of a card are estimated to be more malicious, making the most malicious events easy to identify. Anomalousness is assigned to the brightness of each dot, with more anomalous events appearing darker. As events appear and move across the screen, the analyst can click the dots to show more information in a detail view. The detail view also contains a history of previously clicked events, which are shown below the most recently clicked event, allowing analysts to easily find events that previously of interest.

Occasionally, the network may experience periods of high traffic. The analyst may then change the time window or make use of the histogram filters. Anomalousness and maliciousness histograms can be added and are shown at 520 at the right of the display. The histograms serve two functions: 1) providing an overview of the traffic in the current time range, and 2) serving as filters to select ranges of anomalousness and maliciousness scores to hide events that are not of interest. A ratio of normal to policy violating traffic can also be displayed for the current time window at the top right of the display.

Figure 6:
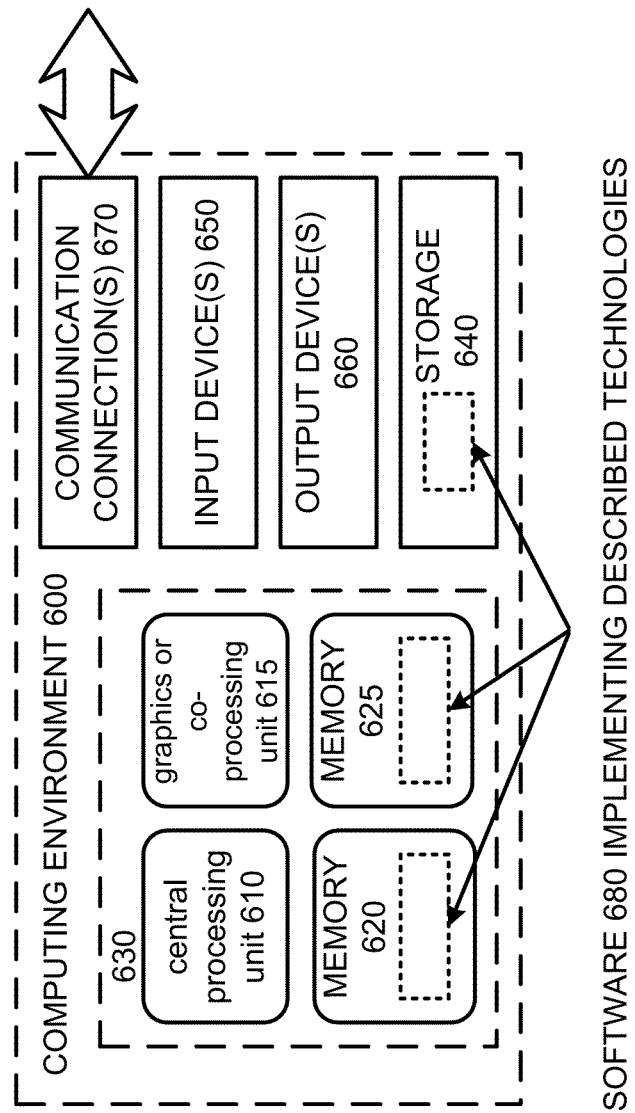
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s).

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of detecting and classifying anomalous events, comprising:
receiving an input log file including a plurality of events, wherein each event comprises a data set;
for each event, providing multiple contexts that group the data set into different sub-groups, wherein one or more anomaly detectors are coupled to each context;
generating an anomaly score for each context by using each context's one or more anomaly detectors, so that each event is associated with at least two anomaly scores generated for different contexts;
for each event, combining at least the at least two anomaly scores generated for different contexts to generate an overall event score so as to classify the event as being normal or abnormal, wherein combining the anomaly score for each context further includes using domain knowledge in the combination, wherein the using domain knowledge includes modifying functions used in the combination based on whether the event is targeting a protected resource, whether the event violates a network rule, and/or whether a role of a network machine associated with the event is unexpected; and
outputting a plurality of the overall event scores for the input log file, wherein the outputting includes:
displaying the events as dots that travel across a display in time steps as the events are being received as streaming data, and
displaying at least one anomaly score and a maliciousness score associated with each event.

2. The method of claim 1, wherein the overall event score is an indicator of whether the event is malicious network traffic.

3. The method of claim 1, wherein each data set includes at least a source and destination network address.

4. The method of claim 3, wherein the data set further includes a description of the event and a time when the event occurred.

5. The method of claim 1, wherein the log file is a continuous stream of events that are received in real time.

6. The method of claim 1, wherein combining the anomaly score for each context includes reading a policy document to determine weightings for the combination and/or functions used in the combination.

7. The method of claim 1, further including for each event, transforming the data set associated with the event into a predetermined format.

8. The method of claim 1, wherein the combining is a linear combination of the anomaly scores using weighted inputs.

9. The method of claim 1, wherein the combining using a history of a previous event.

10. A non-transitory computer-readable medium having instructions thereon for executing a method of detecting and classifying anomalous events, the method comprising:
receiving a plurality of input network events;
transforming the input network events so that each event is associated with a position parameter, which includes at least a source and destination network address, a value parameter, which is a description of the event, and a time parameter indicating when the event occurred;
generating a plurality of context definitions that aggregate different sub parts of the position, value and time parameters for each input network event;
generating a plurality of anomaly detectors, wherein each anomaly detector is coupled to one or more of the plurality of context definitions;
calculating a plurality of anomaly scores for each input network event using the anomaly detectors, wherein at least two of the plurality of anomaly scores are calculated using different anomaly detectors;
calculating a maliciousness score for each input network event using the plurality of anomaly scores: and
outputting a plurality of the maliciousness scores for the input network events, wherein the outputting includes:
displaying the input network events as dots that travel across a display in time steps as the input network events are being received as streaming data, and
displaying at least one anomaly score and the maliciousness score for each input network event.

11. The computer-readable medium of claim 10, wherein calculating the maliciousness score includes using a linear combination of the anomaly scores.

12. The computer-readable medium of claim 11, further including reading a file including weighting information used in the linear combination.

13. The computer-readable medium of claim 10, wherein calculating the plurality of anomaly scores includes retrieving previous state information associated with a history of the event.

14. The computer-readable medium of claim 10, wherein generating a plurality of anomaly detectors includes using one or more position sub-parts including one or more of the following: source port address, destination port address, and network protocol.

15. A system for detecting and classifying anomalous events, comprising:
  a data model for receiving events and transforming the events into a common format, wherein the transforming comprises transforming the events so that each event is associated with a position parameter, which includes at least a source and destination network address, a value parameter, which is a description of the event, and a time parameter indicating when the event occurred;
  a plurality of anomaly detectors for receiving the events from the data model, such that each event is associated with more than one anomaly detector, and generating a plurality of anomaly scores associated with each event;
  a classifier coupled to the anomaly detectors for generating a maliciousness score for each event based on the plurality of anomaly scores associated with each event; and
  a display device configured to display the events as dots that travel across the display device in time steps as the events are being received as streaming data, and to display at least one anomaly score and the maliciousness score for each event.

16. The system of claim 15, wherein the classifier receives network policy and network role data in generating the maliciousness score.

17. The system of claim 15, wherein the user can control weights used in generating the maliciousness score.

* * * * *